(12) United States Patent
Geiger

(10) Patent No.: US 8,928,595 B2
(45) Date of Patent: Jan. 6, 2015

(54) TOUCH SCREEN CALIBRATION SENSOR

(75) Inventor: Avi Geiger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 12/145,484

(22) Filed: Jun. 24, 2008

(65) Prior Publication Data

US 2009/0315838 A1 Dec. 24, 2009

(51) Int. Cl.
*G06F 3/041* (2006.01)
(52) U.S. Cl.
CPC .................................... *G06F 3/0418* (2013.01)
USPC .......................................................... 345/173
(58) Field of Classification Search
USPC .......................................................... 345/173
See application file for complete search history.

(56) References Cited

U.S. PATENT DOCUMENTS

| | | | |
|---|---|---|---|
| 5,510,813 A * | 4/1996 | Makinwa et al. | 345/173 |
| 6,246,394 B1 | 6/2001 | Kalthoff et al. | |
| 6,262,718 B1 | 7/2001 | Findlay et al. | |
| 6,456,952 B1 | 9/2002 | Nathan | |
| 6,504,530 B1 * | 1/2003 | Wilson et al. | 345/173 |
| 6,977,646 B1 | 12/2005 | Hauck et al. | |
| 7,109,978 B2 | 9/2006 | Gillespie et al. | |
| 7,158,122 B2 | 1/2007 | Roberts | |
| 7,202,858 B2 | 4/2007 | DeGroot et al. | |
| 2003/0006973 A1 * | 1/2003 | Omura et al. | 345/175 |
| 2006/0007177 A1 | 1/2006 | McLintock | |
| 2006/0227114 A1 | 10/2006 | Geaghan et al. | |
| 2007/0195067 A1 | 8/2007 | Zotov et al. | |
| 2008/0142280 A1 * | 6/2008 | Yamamoto et al. | 178/18.02 |
| 2009/0153438 A1 * | 6/2009 | Miller et al. | 345/55 |

OTHER PUBLICATIONS

"P1P Touchscreen Installation Guide", retrieved at <<http://www.ctcusa.com/Support/Manuals/PDF_Zip/06205100.pdf>>, pp. 1-10.
"Analog Devices' New Capacitance-to-Digital Converter Uses Advanced Sensing Technology to Improve Accuracy and Reliability of Touch Controls in Handheld Consumer Electronics", Dec. 12, 2005, Analog Devices, Inc., pp. 2.
"PP04 HiBrite PowerPanel", retrieved at <<http://www.analog.com/en/content/0,2886,760%255F1077%255F89174,00.html>>, pp. 2.
Vidales, "How to Calibrate Touch Screens", May 31, 2002, CMP Media LLC, pp. 8.

* cited by examiner

*Primary Examiner* — Jonathan Boyd
(74) *Attorney, Agent, or Firm* — John Jardine; Kate Drakos; Micky Minhas

(57) ABSTRACT

A touchscreen may be calibrated using a second sensor that may be placed around the periphery of the touchscreen in a known position with respect to the touchscreen. The second sensor may be incorporated into a bezel and may have one or more sensor elements. The second sensor may be used to sense the position of a user's finger or stylus when the user touches an object on the touchscreen display, and the second sensor output may be used to update a calibration factor based on the position of the displayed object. The second sensor may be used to periodically recalibrate the touchscreen any time an object is selected in proximity to the second sensor.

24 Claims, 4 Drawing Sheets

400
METHOD FOR USING
SECOND SENSOR

TOUCH SCREEN CALIBRATION SENSOR

BACKGROUND

Touchscreen interfaces are used in many applications, from cellular telephones to point of sale kiosks. Touchscreen devices enable a user to interact with a display device by pointing or touching the surface of the display.

Several different technologies may be used in touchscreen devices. Two commonly used technologies are resistive touchscreens and capacitive touchscreens. A resistive touchscreen is one in which the resistance change between two translucent sheets is measured when a user presses a point on a display. A capacitive touchscreen measures the capacitive change between a user's finger or stylus and the surface of a display to detect the presence and position of the touch. In both cases, the touchscreen sensor is placed over the surface of the display.

Some touchscreen input devices may be calibrated on first use or periodically over the lifetime of a device. Such calibration can be tedious and sometimes confusing to a user.

SUMMARY

A touchscreen may be calibrated using a second sensor that may be placed around the periphery of the touchscreen in a known position with respect to the touchscreen. The second sensor may be incorporated into a bezel and may have one or more sensor elements. The second sensor may be used to sense the position of a user's finger or stylus when the user touches an object on the touchscreen display, and the second sensor output may be used to update a calibration factor based on the position of the displayed object. The second sensor may be used to periodically recalibrate the touchscreen any time an object is selected in proximity to the second sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
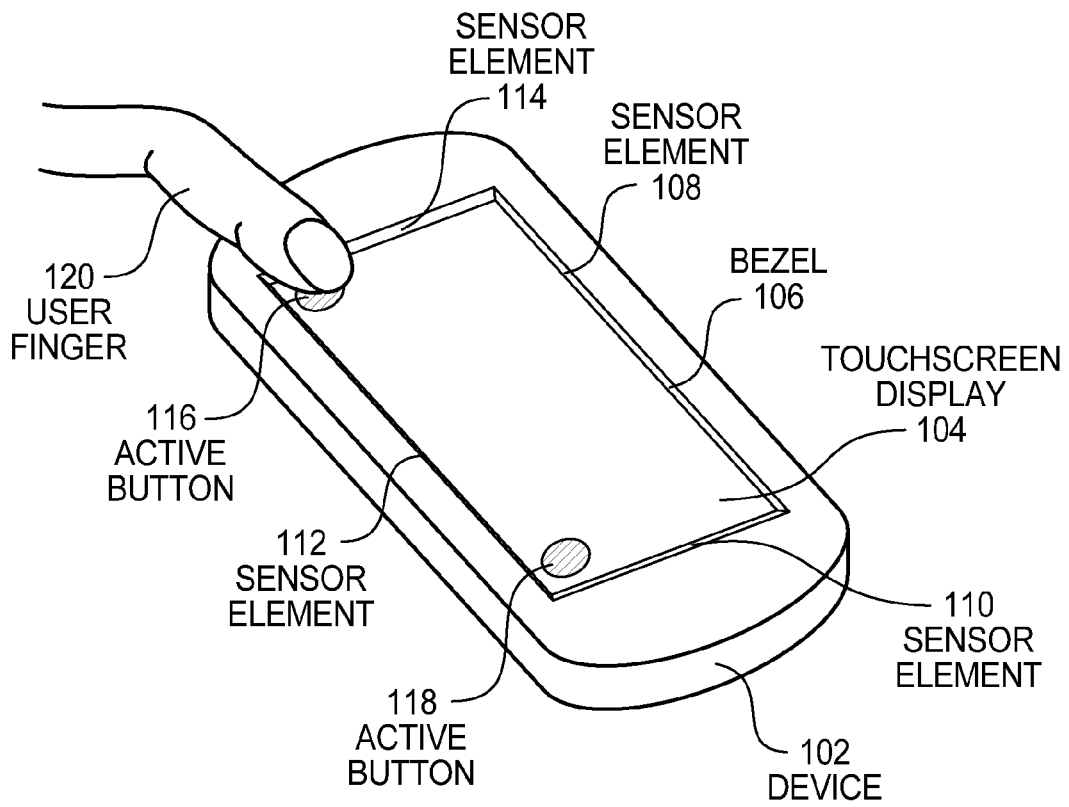
FIG. 1 is a perspective illustration of an embodiment showing a device with integral calibration sensors for a touchscreen.

A touchscreen may have a display and a touch sensor along with a second sensor. The second sensor may be used to sense the presence and position of a finger or stylus when a touch is performed on the touchscreen. Output from the second sensor may be used to verify the position of the touch for calibration of the touch sensor with respect to the display.

The second sensor may be incorporated into a bezel around the periphery of the display. In some embodiments, the bezel may be a conductive material and the second sensor may use capacitive sensing to detect the presence of a finger or stylus when a touch is performed. The position sensed by the second sensor may be compared to the position sensed by the touch sensor to recalibrate the touch sensor. Other embodiments may use force sensors, photoelectric sensors, and other types of sensor technology.

In some embodiments, the second sensor may have multiple sensing elements, and may be capable of sensing the position of a finger or stylus when two or more elements are touched simultaneously. An example may be where two elements converge in a corner of a display.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a perspective illustration of an embodiment 100 showing a device 102 with a touchscreen. The device 102 may have a second sensor or set of sensors in a known physical location with respect to the touchscreen. The second sensor may be used to initially or periodically calibrate a touch sensor. A touch sensor may be able to discriminate the presence and position of a touch on a touchscreen.

A set of calibration factors may be used by a touch sensor to determine the position of a touch event. The calibration factors may be used in a function that has an input from a touch sensor and an output of positional coordinates with respect to the touchscreen display. In some cases, a touch sensor may be installed with default values that may enable at least a coarse position to be detected. In other cases, a touch sensor may be installed without any values and a touch sensor calibration routine may be performed during initial startup.

Some touchscreen technologies may drift over time, meaning that the position calculated at one time for a touch event may be different for a later touch event at the same physical location. A touchscreen re-calibration routine may be performed at regular intervals so that the calibration factors may be updated as the sensor drifts.

In some embodiments, the re-calibration routine may be incorporated into any touchscreen event that may occur where the second sensor may be capable of detecting a touch. The position determined by the touch sensor may be compared to the position determined by the second sensor and the calibration factors for the touch sensor may be updated. When the position detected by the second sensor corresponds with the position detected by the touch sensor, the calibration factors may be verified.

In such an embodiment, a touchscreen device may periodically or continually update or verify the calibration factors with each touch event. In some implementations, the calibration routine may be a function that automatically operates with each touch event.

The second sensor may be any type of sensor that may detect a touch event separately from a touch input for a touch screen. The second sensor may be positioned so that a touch event or a range of touch events may actuate the second sensor. In many cases, the second sensor may be positioned around the periphery of a touchscreen and may be used to sense a touch event near the edge of a touchscreen.

For example, embodiment 100 shows a device 102 that has a touchscreen display 104. The touchscreen display 104 may be made up of a display and a touch input. The touch input may be able to detect a touch event and resolve the position of a touch event. The device 102 may have a bezel 106 that may incorporate four sensor elements 108, 110, 112, and 114. The four sensor elements 108, 110, 112, and 114 may detect the presence of a user finger 120 when the user finger 120 touches active buttons 116 and 118. Each of the four sensor elements 108, 110, 112, and 114 may detect the presence of a finger along each of the respective edges of the touchscreen display 104.

The active buttons 116 and 118 may be any type of object that may be displayed and which may be activated, selected, or otherwise manipulated through a touch input. The active buttons 116 and 118 are located in the corners of the touchscreen display 104 so that a touch event on either active button 116 or 118 may be sensed using the second sensor located in the bezel 106. In many cases, an active button may be used in the middle of the touchscreen display 104 in a position not capable of being sensed by the second sensor.

The four sensor elements 108, 110, 112, and 114 may use various sensor technologies to determine that the user finger 120 is present. In some cases, a plated or metalized portion of the bezel 106 may be used as a capacitive sensor. In other cases, the bezel 106 may incorporate mechanical switches or other sensing technologies.

The device 102 may have four sensing elements. By using multiple sensor elements, the second sensor may be able to discriminate a touch event with limited accuracy. For example, if the user finger 120 is touching both the sensor element 112 and sensor element 114, the input to the second sensor may indicate that the user finger 120 is in the upper left corner of the touchscreen 104 over the active button 116.

If the sensor element 112 is sensed but not sensor elements 114, the second sensor may be able to determine that the user finger 120 is present on the left hand edge of the periphery of the touchscreen display 104. However, the second sensor may not be able to further discriminate the finger position along the left hand edge.

A four element sensor, such as in embodiment 100, may be capable of discriminating along all four edges of the touchscreen display 104 as well as quite accurately at each corner of the touchscreen display 104. For example, the four element sensor of embodiment 100 may be able to discriminate which of the active buttons 116 and 118 were pressed.

In some embodiments, the second sensor may be composed of many additional elements, each of which may add further accuracy or discrimination to a touch event sensed by the second sensor.

Other embodiments may use a single sensing element. When a single sensing element is used, the second sensor may detect that a finger is touching the bezel 106 but the second sensor may not be able to discriminate any further. Such an embodiment may be used in cases where a single active button or other object is displayed near the second sensor. A touch event coupled with a detection by the second sensor may be used to calibrate the touch input in such a case.

A single sensor embodiment may be used with two or more active buttons or other objects to determine a position along one axis when those active buttons are aligned with the axis. For example, active buttons 116 and 118 are aligned with the left hand edge of the touchscreen display. If either active button 116 or 118 are touched and the sensor element 112 also senses the user finger 120, the touch event and sensing event may be used to calibrate the touchscreen in the horizontal axis, since both active buttons 116 and 118 share the same approximate location on the horizontal axis. Because a single element second sensor may not be able to discriminate vertically, the second sensor may not be able to determine which of the active buttons 116 and 118 were touched. However, the second sensor input may be used to calibrate at least one axis and may disregard or forego calibration for another axis.

The device 102 may be any type of device with a touchscreen display 104. Many handheld devices, such as cellular telephones and handheld scanners, may have a touchscreen.

Many other devices may include touchscreen user interfaces, such as retail kiosks, industrial controllers, and commercial input devices that may be used in restaurants, checkout lines, and other locations. Each touchscreen interface may include a second sensor for initially, periodically, or continually updating the calibration factors that may be used to determine the location of a touch event.

A second sensor for a touchscreen device may be able to discriminate or detect the position of a touch event away from the edge or periphery of a touchscreen. For example, a second sensor may incorporate one or more photoelectric sensors that may project a beam across the surface of the touchscreen display 104. When the beam is broken, the second sensor may detect that a finger, stylus, or other object is present. In some such embodiments, one or more photoelectric sensors may be used to detect one or more locations horizontally and one or more locations vertically.

Such embodiments may detect the location of a specific point at the intersection of a vertical and horizontal sensor. The location of a specific point may be used to determine separate calibration factors for horizontal and vertical components of a touch input. In such a use, an active button or object may be displayed at the intersection of a horizontal and vertical sensor. When both the vertical and horizontal sensors are activated, the touch event may be calibrated in both horizontal and vertical directions. When an object is placed on the display aligned with a sensor which is aligned vertically across the display, a touch event may be calibrated in the horizontal direction but not the vertical direction.

The calibration of a touch screen may occur where no changes are made to a set of calibration factors. In such a case, a second sensor may verify and confirm the sensor input from a touch sensor. Such a confirmation may be used to raise the confidence in the existing calibration factors and limit the deviation that may occur in a later calibration. For example, calibration factors may be modified using various time series analysis tools and other mathematical constructs that may enable the calibration factors to be modified over time, based on a history or trend of data points. A history of consistent data points may be used to limit the amount of deviation that may be taken when a new data point is encountered that deviates substantially from the previous set of data points.

Some embodiments may use multiple types of sensors for a second sensor system. For example, a pair of photoelectric beam sensors may be arranged to intersect in the center of a display and a single element or multiple element capacitive sensor may be integrated into a bezel around the display. In such an example, the capacitive sensor may be used for calibrations around the periphery and the photoelectric beam sensor may be used for calibrations in the middle of the display.

Figure 2:
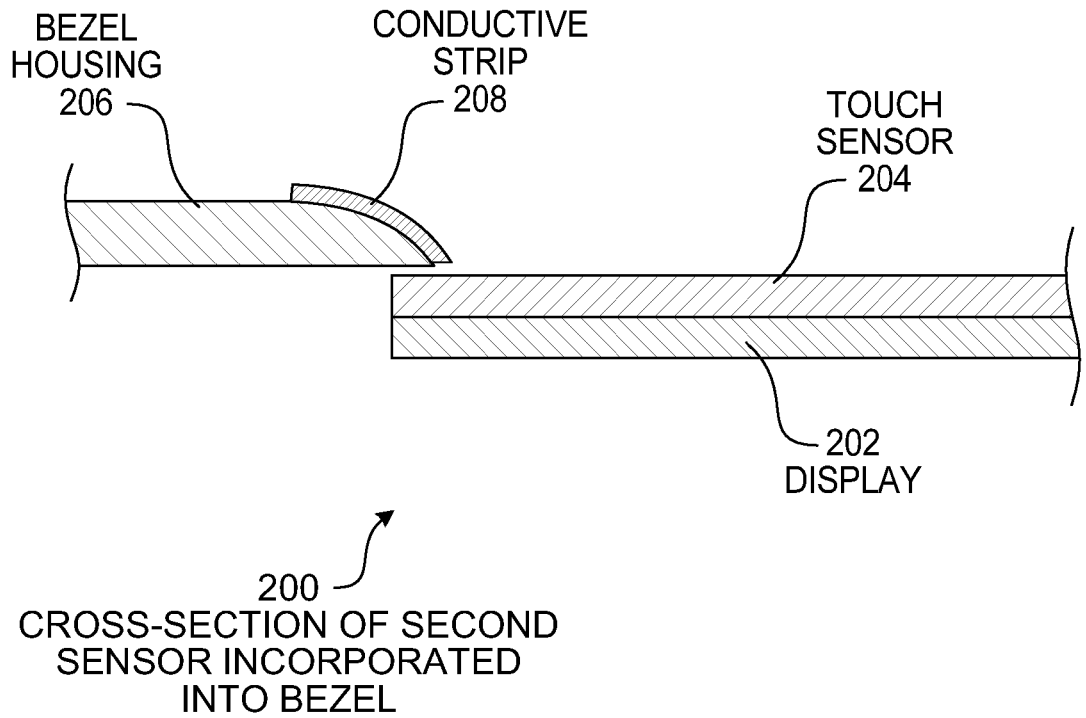
FIG. 2 is a cross-section illustration of an embodiment showing a second sensor incorporated into a bezel.

FIG. 2 is a cross-section illustration of an embodiment 200 showing a second sensor incorporated into a bezel. Embodiment 200 is an example of an electrical sensor that may be incorporated into a bezel while maintaining the aesthetics of a device.

The display 202 may be a liquid crystal display or other flat-panel display technology, including light emitting diode or plasma displays. In some cases, the display 202 may be a cathode ray tube or other, non-flat panel display.

The touch sensor 204 may be a laminate that is attached to the exterior surface of the display 202. The touch sensor 204 may be a resistive touchscreen element or some other touch sensor technology. In many cases, a touch sensor 204 may have various wires or connections that may protrude past the edge of the display 202 in one or more areas. In many cases, a housing for such a touchscreen device may include a bezel housing 206 that may cover the edge of the display 202 and touch sensor 204 around at least a portion of the periphery.

The bezel housing 204 may contain a conductive strip 208 that may extend along the length of the bezel housing 204 near the junction between the touch sensor 204 and the bezel housing 204. The conductive strip 208 may be used as an electrical sensor to detect a finger or stylus that may contact the conductive strip 208 at the same time as the touch sensor 204. In such a manner, the conductive strip 208 may serve as a component of a second sensor as described in embodiment 100.

In many devices, the bezel housing 206 may be formed of injection molded plastic or other non-conductor. The conductive strip 208 may be formed by laminating a conductive metal foil onto the bezel housing 206, by selectively electroplating a conductive coating, or by other manufacturing mechanisms.

The conductive strip 208 may be connected to electric circuitry that may be used to sense the presence of a finger or stylus. Such circuitry may be capable of sensing capacitive, resistive, or inductive changes that may occur when a finger or stylus comes near to or touches the conductive strip 208.

Other embodiments may use different types of sensors. In some cases, the bezel housing 206 may incorporate mechanical switches, strain gages, or other elements that may be used to detect a finger press on the edge of the bezel housing 206. Such embodiments may use a mechanical deflection of a finger or stylus to sense a change.

In some embodiments, a photoelectric sensor may be placed between the bezel housing 206 and the touch sensor 204. Such sensors may use a transmitter and receiver to create a beam that may be broken to detect the presence of a finger or stylus. The beam may be any size. In some cases, a photoelectric sensor may produce a digital output of on or off. In other cases, a photoelectric sensor may produce an analog or other signal that may have many different levels of output.

Some second sensor embodiments may use multiple photoelectric sensors. In some such embodiments, some photoelectric beams may be oriented vertically while others are oriented horizontally. In some cases, one or more beams may be oriented diagonally with respect to a touchscreen device. Such embodiments may have the beams arranged to intersect in one or more locations, and may use mirrors to create multiple beams using a single transmitter and receiver pair.

Some second sensor embodiments may use multiple photoelectric sensors arranged in parallel. In such a case, the position of a finger or stylus may be detected and the position discriminated based on which of the photoelectric beams are broken and the spacing or resolution of the beams.

Figure 3:
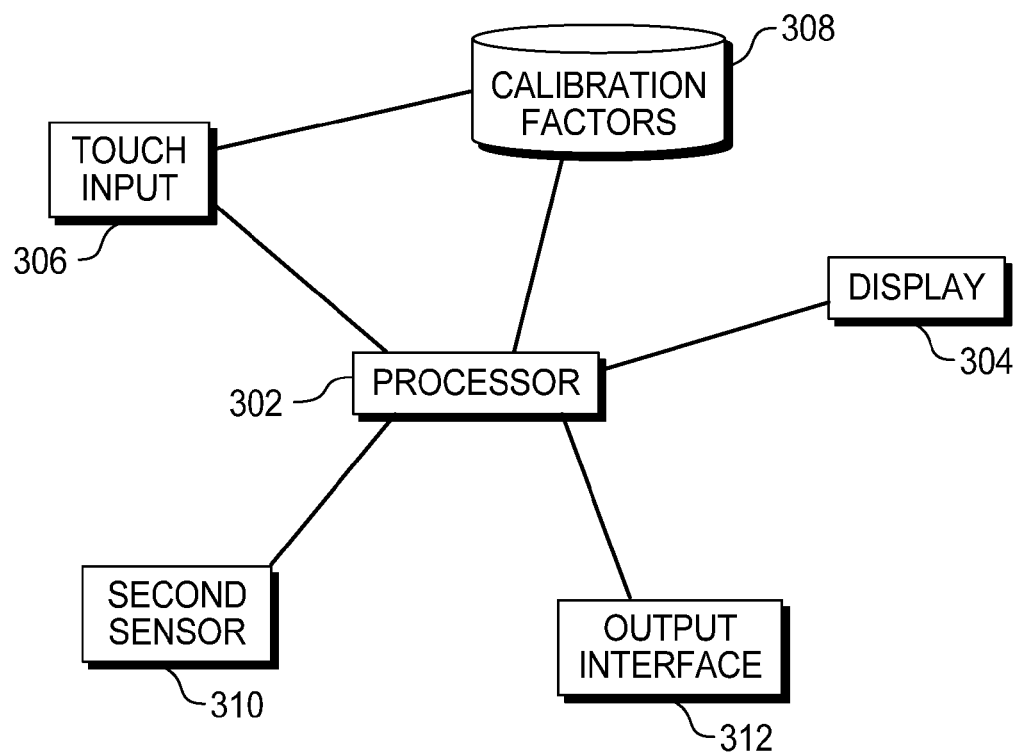
FIG. 3 is a diagram illustration of an embodiment showing functional elements of a touchscreen system.

FIG. 3 is a diagram illustration of an embodiment 300 showing some functional components of a touchscreen system. Embodiment 300 is a simplified example of the various functions and components that may be used within a touchscreen apparatus for detecting a touch event, resolving a position for the touch event, and performing calibration of the system.

The diagram of FIG. 3 illustrates functional components of a system. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

The processor 302 may cause various objects to be displayed on a display 304. A user may interact with a touch input 306 by pressing the display 304 at various locations. The touch input 306 may produce a signal that identifies a touch event and determines a position for the touch event. The position may be a horizontal and vertical location of the touch event with respect to the horizontal and vertical axes of the display 304.

In order to determine a position of a touch event, the touch input 306 may use a set of calibration factors 308. The calibration factors 308 may correlate the raw sensed position of a touch event with the coordinates of the display 304. In many cases, manufacturing variations in the components or assembly of the components, as well as sensor drift over time or due to environmental factors may cause the touch input 306 to return raw coordinates that are different from the actual coordinates of an object on the display 304.

A second sensor 310 may be used to determine the location of some touch events. The second sensor 310 may be placed in a known location with respect to the display 304 so that any touch event that is sensed by the second sensor 310 may be assumed to be in a specific location. The output of the second sensor 310 may be used to verify and calibrate the output from the touch input 306. In cases where the second sensor 310 and the touch input 306 do not agree, an updated set of calibration factors 308 may be created so that subsequent touch events may result in output that agrees between the touch input 306 and the second sensor 310.

An output interface 312 may communicate the presence and position of a touch event to another processor, software application, or hardware device.

Figure 4:
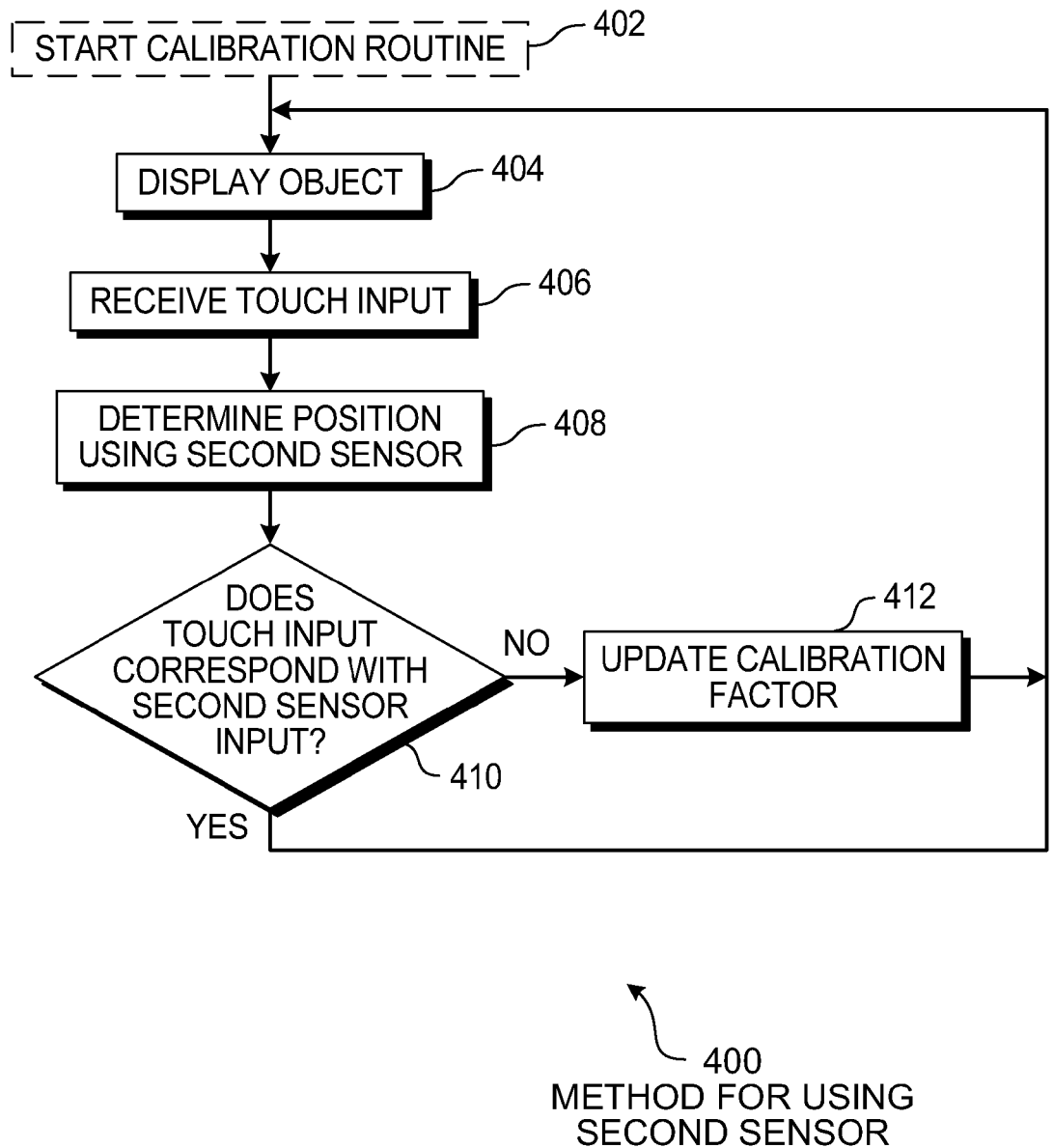
FIG. 4 is a flowchart illustration of an embodiment showing a method for using a second sensor for calibrating a touchscreen.

FIG. 4 is a flowchart illustration of an embodiment 400 showing a method for using a second sensor with a touchscreen device. Embodiment 400 may present an object on a display at a known location and receive a touch input for that object as well as an input from a second sensor. The second sensor may be positioned at a known physical location with respect to the display, and may be used to update one or more calibration factors used by a touch input device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a calibration routine. In some embodiments, the calibration routine may be performed as a dedicated application. In other embodiments, embodiment 400 may be performed at every touch event.

When the embodiment 400 is performed as a calibration routine, the calibration routine may be started in block 402.

An object may be displayed in block 404, and a touch input may be received in block 406. The touch input may include the presence and position of a touch event. The position may be calculated using calibration factors and may be determined relative to the display on which the object is displayed.

A position of the touch event may be determined using a second sensor in block 408. The position as determined by a second sensor may be a positive determination of the position with respect to one or more axes. For example, if a two element second sensor detects a touch event with both elements, the touch event may be positively determined to be at the intersection of both elements.

In some cases, the position may be determined by a single element of a second sensor. For example, a single element sensor may detect that a touch event occurred near the periphery of a touchscreen. The detection may not be able to determine a precise horizontal and vertical position of the touch event. However, if only one object was displayed on the touchscreen that was close to the periphery of the touchscreen, the touch event may be correlated to that object. When two or more objects are located in close proximity to the second sensor, the second sensor may not be able to determine a position.

In another example, a second sensor may be able to resolve one axis of a position of a touch event. For example, the sensor element 112 of embodiment 100 may be capable of sensing a touch event at any object along the left hand edge of the touchscreen 104, but may not be able to resolve the vertical position along that edge. By sensing the horizontal component of a touch event, horizontal calibration factors may be updated.

In some cases, a second sensor may be able to sense by a negative determination. In other words, a determination of a touch event position by a second sensor may be deduced by the absence of a sensed input from a portion of the second sensor. In the example of the active button 116 of embodiment 100, the second sensor may sense a positive input from the sensor element 112 on the left hand side, but no input from the sensor element 114. Such an occurrence may happen when the user finger 120 does not touch the sensor element 114 even though the user finger 120 does touch the active button 116. In such a case, the actual position of the touch event, as determined by the second sensor, may be along the left edge but an unknown distance from the top edge.

If the touch input corresponds with the second sensor input in block 410, the process may return to block 404. If the touch input does not correspond with the second sensor input in block 410, the calibration factors may be updated in block 412.

In some embodiments, the calibration factors of block 412 may include separate calibration factors for different axes. In a typical example, such axes are arranged in a horizontal and vertical manner with respect to the display. Other embodiments may use non-orthogonal axes and other coordinate systems.

In some cases, the orientation and configuration of the second sensor in block 408 may apply to only a portion of the calibration factors in various instances.

One typical embodiment may use a single sensor element that may be incorporated into a bezel of a touchscreen device. The single sensor element may sense contact with a user finger at any location around the periphery of the touchscreen. When a button is placed along the lower edge of the display but away from both the left and right edges, the second sensor may confirm the position of a user finger in the vertical direction when a touch event is sensed for the button.

Similarly, when a button is placed along the left or right edges of the display but away from both the top and bottom edges of the touchscreen, the second sensor may be used to confirm the position of a user finger or stylus in the horizontal direction. In a third use, an active button in the corner of a touchscreen may determine both horizontal and vertical positions of a sensed touch event.

For each touch event, block 408 may determine only a portion of the position of any input received by a second sensor. The determination may be made based on the touch input received in block 406 in some instances. In such a case, the touch input may include a calculated position of the touch event. The calculated position may be used to determine which axes, if any, may correspond with a second sensor input. Such an embodiment may be used by a touchscreen device to automatically re-calibrate the calibration factors without using input from an application to know the position of the object displayed in block 404. Such an embodiment may perform a re-calibration on an ongoing basis.

In some embodiments, such as when a calibration routine is performed, the analysis of a second sensor input may be made using a position of an object on a display. For example, a calibration routine may present an active button at a particular, known location on a display. The location of the button may be used to determine which axes, if any, may be used to re-calibrate or set the calibration factors in block 412.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A device comprising:
   a touchscreen comprising a display and a touch input mechanism;
   a second sensor mechanism located at a first location, said first location in a known physical location with respect to said touchscreen, said second sensor mechanism mounted into a bezel around said touchscreen, and said second sensor mechanism configured to detect a touch event at a second location on the touchscreen at said first location, wherein said first location and said second location are different locations with respect to the touchscreen; and
   a processor configured to:
      cause said display to present an object in said second location on the touchscreen, the object presented at a known physical location on the touchscreen with respect to the second sensor mechanism;
      receive a touch input from said touch input mechanism providing a positional location of the touch input on said touchscreen, the positional location comprising raw coordinates associated with the touch input;
      receive an indication of detection of the touch event at the second location from said second sensor mechanism, the indication corresponding to an actual location on the touchscreen; and
      determine a calibration factor of the positional location of said touch input based on the indication of detection of said touch event at said object in the second location from said second sensor mechanism at the first location by comparing the raw coordinates associated with the positional location with the actual location determined by the second sensor mechanism.

2. The device of claim 1, said processor further configured to:
   change at least one calibration factor based on said positional location.

3. The device of claim 1, said first location being at a portion of a periphery of said display.

4. The device of claim 3, said first location being at a corner of said periphery of said display.

5. The device of claim 3, said first location being away from said periphery of said display.

6. The device of claim 1, said second sensor comprising a single sensing element.

7. The device of claim 1, said second sensor comprising a plurality of sensing elements.

8. The device of claim 7, at least two of said plurality of elements being capable of being touched simultaneously.

9. The device of claim 8, said at least two of said plurality of elements being disposed adjacent to a corner of said display.

10. The device of claim 1 wherein the touch input mechanism is a finger.

11. The device of claim 1, said second sensor comprising a capacitive sensor.

12. The device of claim 1, said second sensor comprising a mechanical sensor.

13. The device of claim 1, said second sensor comprising a photoelectric sensor.

14. A method comprising:
   displaying an object on a touchscreen in a first location, said touchscreen comprising a display and a touch input mechanism, the object displayed at a known physical location with respect to a second sensor mechanism;
   receiving a touch input with a positional location from said touch input mechanism, the positional location comprising raw coordinates associated with the touch input;
   sensing an indication of detection of said touch event at by the second sensor mechanism located at a second location the second location in a known physical location with respect to said touchscreen, the indication corresponding to an actual location on the touchscreen, the second location at a location different from the first location with respect to the touchscreen; and
   determining a calibration factor of said positional location of said touch input based on the indication of detection of said touch event at said object in said first location from said second sensor mechanism at the second location by comparing the raw coordinates associated with the positional location with the actual location determined by the second sensor mechanism.

15. The method of claim 14, said at least one calibration factor being a horizontal calibration factor or a vertical calibration factor.

16. The method of claim 14, said positional location being determined at least in part by a plurality of sensing elements of said second sensor.

17. A device comprising:
   a touchscreen comprising a display and a touch input mechanism;
   a second sensor mechanism located at a first location, said first location in a known physical location with respect to said touchscreen, said second sensor mechanism being disposed around a periphery of said display, and said second sensor mechanism configured to detect a touch event at a second location on the touchscreen at said first location; and
   a processor configured to:
      cause said display to present an object in said second location on the touchscreen, the object presented at a known physical location on the touchscreen with respect to the second sensor mechanism;
      receive a touch input from said touch input mechanism providing a positional location of the touch input on said touch screen, the positional location comprising raw coordinates associated with the touch input;
      receive an indication of detection of said touch event at the second location from said second sensor mechanism, the indication corresponding to an actual location on the touchscreen; and determine a calibration factor of the positional location of said touch input based on the indication of detection of said touch event at said object in the second location from said second sensor mechanism at the first location by comparing the raw coordinates associated with the positional location with the actual location determined by the second sensor mechanism.

18. The device of claim 17, said second sensor mechanism comprising a plurality of sensor elements.

19. The device of claim 18, said second sensor mechanism comprising at least four sensor elements.

20. A device comprising:
a touchscreen comprising a display and a touch input mechanism;
a second sensor mechanism located at a first location, said first location in a known physical location with respect to said touchscreen, and said second sensor mechanism configured to detect a touch event at a second location on the touchscreen at said first location, wherein said first location and said second location are different locations with respect to the touchscreen; and
a processor configured to:
cause said display to present an object in said second location on the touchscreen, the object presented at a known physical location on the touchscreen with respect to the second sensor mechanism;
receive a touch input from said touch input mechanism providing a positional location of the touch input on said touchscreen, the positional location comprising raw coordinates associated with the touch input;
receive an indication of detection of the touch event at the second location from said second sensor mechanism, the indication corresponding to
an actual location on the touchscreen; and
determine a calibration factor of the positional location of said touch input based on the indication of detection of said touch event at said object in the second location from said second sensor mechanism at the first location by comparing the raw coordinates associated with the positional location with the actual location determined by the second sensor mechanism.

21. The device of claim 20, said processor further configured to:
change at least one calibration factor based on said positional location.

22. The device of claim 20, said first location being at a portion of a periphery of said display.

23. The device of claim 20, said second sensor comprising a plurality of sensing elements.

24. The device of claim 20, at least two of said plurality of elements being capable of being touched simultaneously.

* * * * *